US012784754B2

(12) United States Patent
Bush et al.

(10) Patent No.: US 12,784,754 B2
(45) Date of Patent: Nov. 3, 2026

(54) IDENTITY AUTHENTICATION SYSTEM USING ENHANCED PHONETIC DISTANCE MEASUREMENT

(71) Applicant: Denim Health, LLC, Austin, TX (US)

(72) Inventors: Brian Orville Bush, Portland, OR (US); Ben Caleb Gawiser, Austin, TX (US); Satya Narayana Murthy Gunnam, Austin, TX (US); Gökberk Yar, Austin, TX (US)

(73) Assignee: Denim Health, LLC, Austin, TX (US)

( * ) Notice: Subject to any disclaimer, the term of this patent is extended or adjusted under 35 U.S.C. 154(b) by 171 days.

(21) Appl. No.: 18/916,600

(22) Filed: Oct. 15, 2024

(65) Prior Publication Data

US 2026/0105918 A1 Apr. 16, 2026

(51) Int. Cl.
*G10L 17/00* (2013.01)
*G10L 15/26* (2006.01)

(52) U.S. Cl.
CPC .............. *G10L 17/00* (2013.01); *G10L 15/26* (2013.01)

(58) Field of Classification Search
CPC ................................ G10L 17/00; G10L 15/26
See application file for complete search history.

(56) References Cited

U.S. PATENT DOCUMENTS

| | | | | |
|---|---|---|---|---|
| 8,285,537 | B2 | 10/2012 | Tanner et al. | |
| 9,762,728 | B1 * | 9/2017 | Cox | H04L 63/123 |
| 10,148,816 | B2 | 12/2018 | Badger et al. | |
| 2004/0153306 | A1 | 8/2004 | Tanner et al. | |
| 2023/0162731 | A1 * | 5/2023 | Wu | G10L 15/02 704/275 |

* cited by examiner

*Primary Examiner* — Ibrahim Siddo
(74) *Attorney, Agent, or Firm* — Terrile, Cannatti & Chambers, LLP; Michael Rocco Cannatti

(57) ABSTRACT

A method, system, and device for authenticating an identity of a calling party is provided where the device receives a call center access request with audio input of a calling party name and calling party context information, and then converts the audio input of the calling party name into a phonetic format calling party name in a defined n-dimensional vector space with defined SMPH (Sonority, Manner, Place, Height) attributes for comparison with one or more phonetic format candidate names in the defined n-dimensional vector space on the basis of computed similarity metric values in the n-dimensional vector space between the phonetic format calling party name and each of the one or more phonetic format candidate names which are evaluated against one or more predetermined threshold comparison metric values to authenticate the calling party if a computed similarity metric value satisfies the one or more predetermined threshold comparison metric values.

20 Claims, 3 Drawing Sheets

| Patient Name | DOB | SSN | Health Record |
|---|---|---|---|
| John Adams | 5/23/1963 | 459-##-#### | |
| Brook Jones | 9/8/1997 | 872-##-#### | |
| Scott Cain | 1/2/2003 | 914-##-#### | |
| Ben Cannatti | 6/6/1970 | 551-##-#### | |
| Pat Salmon | 3/1/2000 | 899-##-#### | |

Patient Records Monday, September 22, 2024

| Patient Name | DOB | SSN | Health Record |
|---|---|---|---|
| John Adams | 5/23/1963 | 459-##-#### | |
| Brook Jones | 9/8/1997 | 872-##-#### | |
| Scott Cain | 1/2/2003 | 914-##-#### | |
| Ben Cannatti | 6/6/1970 | 551-##-#### | |
| Pat Salmon | 3/1/2000 | 899-##-#### | |

IDENTITY AUTHENTICATION SYSTEM USING ENHANCED PHONETIC DISTANCE MEASUREMENT

BACKGROUND OF THE INVENTION

Field of the Invention

The present disclosure is directed in general to the field of information processing. In one aspect, the present disclosure relates generally to an information processing system, computer program code, method, and apparatus for authenticating access to a data processing system.

Description of the Related Art

A data processing system that grants user access to information that is protected from unauthorized access may use an authentication mechanism to confirm the identity of the user before granting access. For example, healthcare systems often employ call centers to handle millions of calls from patients each year, and the ability to efficiently and accurately authenticate callers can save time for the caller/patient and reduce call center costs in terms of call center agent's time, the software being used, HIPAA compliance, and other related expenses. There are multiple techniques for authenticating the identity of a caller, but a typical first step is to prompt the caller to state the name of the caller/patient, and then to match the name uttered by caller/patient against a list of known patient names at the data processing system. As a result, the patient authentication process is a two sided problem. The first problem is to accurately extract or transcribe identity information from what the patient said, and the second problem is to compare the extracted identity information to a list of possible patients and determine not only if it is a match, but if it is a match for more than one patient. Unfortunately, even the best transcription technologies are not 100% accurate. This makes sense in the context of thinking about what it takes to transcribe what is said by people. It is not always possible to know which homonym the user meant or words that sound similar (e.g., hire vs. fire vs. sire).

Existing solutions for name matching have been proposed which use speech recognition tools to transcribe a spoken name utterance into a text transcription, and then apply a string metric, such as the Levenshtein distance algorithm, to determine the best matching patient name along with the match level for each of the other possible patients. Such systems will return a match, if and only if, there is one and only one patient that highly matches the name. While this approach has the advantage of being simple, the similarity comparison distance metric is based on the spelling of the names, and can therefore be inaccurate in cases where there are multiple ways to spell names or when the transcription produces words that sound similar, but are spelled differently (e.g., ate vs. eight). As a result, the existing solutions for identifying and authenticating persons seeking access to a data processing system are extremely difficult at a practical level by virtue of the challenges with providing a user-friendly and secure mechanism for authenticating the identity of the caller/patient which meets the applicable performance, design, complexity and cost constraints.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

Figure 1:
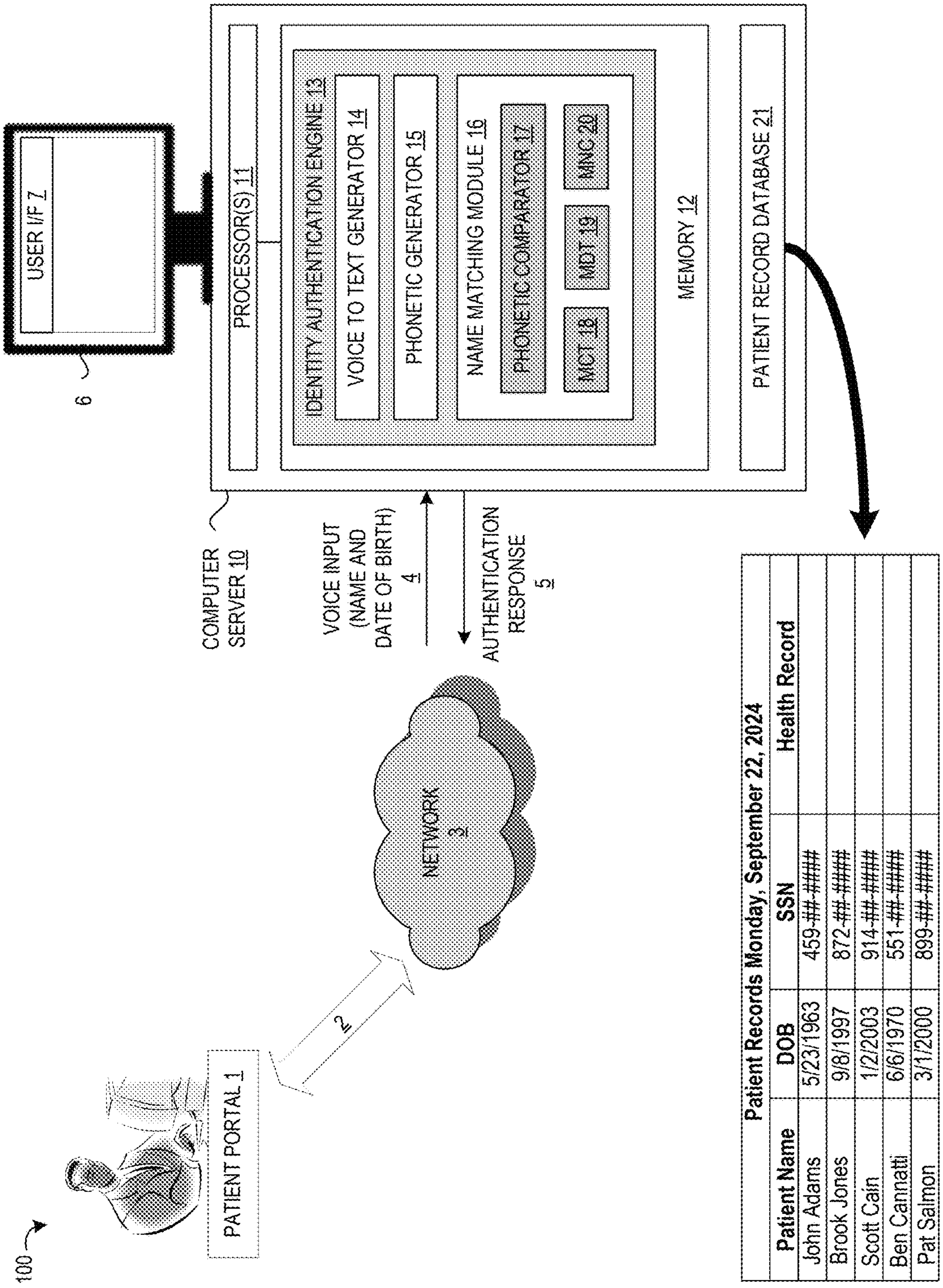
FIG. 1 is a simplified block diagram of an information processing system for authenticating the identity of a user/caller using enhanced phonetic distance metrics in accordance with selected embodiments of the present disclosure.

A system, apparatus, computer program code, and methodology are described for authenticating the identity of a user of a data processing system by transcribing the user's spoken name into a text transcription of the user name, converting the text transcription of the user name into a phonetic representation of the user name, and then comparing the phonetic representation of the user name with phonetic representations of candidate user names from records at the data processing system having a date of birth which matches the date of birth of the user to determine if there is a matching record for the user. As disclosed herein, the comparison processing uses an enhanced phonetic distance measurement technique which employs a combination of sonority, manner, place, and height (SMPH) attributes along with sequence matching algorithms to provide a nuanced and linguistically informed measure of phonetic similarity and distance between the phonetic representation of the user's name and the phonetic representations of candidate user names. In such embodiments, the comparison of phonetic representations applies a name matching model which computes a similarity score between the phonetic representation of the user's name and each phonetic representation of candidate user names. In addition, the computed similarity scores may be evaluated against a configurable minimum confidence threshold (MCT) value to identify potential matches for any similarity score which exceeds the MCT value. In addition, the computed similarity scores may be evaluated against a configurable minimum distance threshold (MDT) value to identify a unique potential match having a similarity score which exceeds the next highest similarity score by the specified MDT value. In addition, the computed similarity scores may be evaluated against a configurable maximum number of candidates (MNC) value to identify a maximum number of candidate user name matches that can be within the minimum distance of the highest match. If the number of candidate user name matches having similarity scores within the minimum distance of the highest score is smaller than the MNC value, then the candidate user name matches will be evaluated with an alternative authentication factor (e.g., on the basis of the social security number records for the user). However, if the number of candidate user name matches having similarity scores within the minimum distance of the highest score equals or exceeds the MNC value, then the candidate user name matches are considered an authentication failure, and the call is transferred to a call center scheduler.

In this disclosure, improved systems, apparatuses and methods are described for using enhanced phonetic distance measurement techniques to generate similarity scores between a user's spoken name and a plurality of stored candidate user names which are selected as a closed, pre-defined set of possibilities based on contextual information associated with the user to provide efficient and accurate authentication of the caller's identity to address various problems in the art where various limitations and disadvantages of conventional solutions and technologies will become apparent to one of skill in the art after reviewing the remainder of the present application with reference to the drawings and detailed description provided herein. While various details are set forth in the following description, it will be appreciated that the present disclosure may be practiced without these specific details, and that numerous implementation-specific decisions may be made to the embodiments described herein to achieve specific goals, such as compliance with design-related constraints, which will vary from one implementation to another. For example, selected aspects are shown in block diagram form, rather than in detail, in order to avoid obscuring the present disclosure. In addition, some portions of the detailed descriptions provided herein are presented in terms of algorithms or operations on data within a computer memory using all hardware such as logic circuits in one or more field programmable gate arrays or using software executing in a computer within data processing hardware, such as an application specific processor or a computer having a processor executing code stored in a non-transitory computer readable medium. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices. Such descriptions and representations are used by those skilled in the art to describe and convey the substance of their work to others skilled in the art. Various illustrative embodiments will now be described in detail below with reference to the figures.

Turning now to FIG. 1, there is shown a simplified block diagram of an information processing system 100 for authenticating the identity of a user/caller using enhanced phonetic distance metrics in accordance with selected embodiments of the present disclosure. Generally speaking, the information processing system 100 includes a first user patient portal 1 which may include a server/computer system which receives and submits user information from the user/caller in spoken form and also displays message prompts to the user/caller. In addition, the information processing system 100 includes a computer server system 10 which provides the capability for authenticating the identity of the user/caller at the patient portal 1 using a phonetic distance metrics scoring tool which evaluates a phonetic representation of the user/caller's name with phonetic representations of candidate user names from records at the computer server system 10 which have matching date of birth information to determine if there is a matching record for the user/caller. In the disclosed information processing system 100, the patient portal 1 is connected over a communication link 2 to a communication network 3 to provide voice input messages 4 to the computer server system 10, and to receive authentication response messages 5 from the computer server system 10.

While a single patient portal 1 is shown in the information processing system 100, it will be appreciated that additional health care information sources can be connected to the computer server system 10 since patients represent a single example of users who may need to have their identities authenticated before being allowed access to the computer server system 10. For example, other users could include a health care provider (e.g., physician or nurse), an emergency medical service (EMS) provider, a hospital system, a laboratory, a pharmacist, an imaging center, and an electronic health record source, though other users known to those in the field may use the identity authentication service disclosed herein.

Generally speaking, the communication link 2 and computer network 3 may be implemented with any suitable design choice, such as an Internet-based communication technology. In other embodiments, the communication link 2 and/or computer network 3 may include a health information exchange (HIE) cloud which facilitates access to and retrieval of clinical data and other medical information (e.g., referral requests, prescription renewals, lab reports, and other patient health data) using data standards such as ICD-9, ICD-10, SNOMED CT, RxNorm, HITSP C32, and LOINC and messaging standards such as HL-7. As a result, when a message is transmitted electronically from one system to another across the network 3, it is sent using a format that is understandable so that it can be translated by the receiving system into exactly what was intended by the sending system. The network 3 is, for example, a computer-based system for exchanging health information electronically by providing a connecting point for an organized, standardized process of data exchange across statewide, regional, and local initiatives, thereby reducing duplication of services (resulting in lower health care costs) and reducing operational costs (e.g., by automating many administrative tasks).

In order to authenticate the identity of the user/caller at the patient portal 1, the computer server system 10 may include one or more processors 11, a memory 12, a display screen 6, and one or more associated input/output devices (not shown) that are connected and configured to receive user submissions, including voice input message 4 submitted over the communication link 2 and computer network 3. In addition, the computer server system 10 may include additional memory storage, including a patient record database 21 which stores a list of authenticated patient records for a specified date and location (e.g., Patient Records on Sep. 22, 2024), where each patient record includes a date of birth (DOB) for the patient, along with additional information, such as a social security number (SSN), caller's phone number, address, biometric data, pass key, voice print, or other identifying characteristic for the patient, and one or more additional health records for that patient.

To illustrate the operative functionality of the computer server system 10, the memory 12 may store computer program code which provides functionality for an identity authentication engine 13. As described hereinbelow, the identity authentication engine 13 includes a voice-to-text generator module 14 which receives a digital audio file message submitted by the patient portal 1 which includes a voice input of the spoken name of the user/caller. In response to the digital audio file message, the voice-to-text generator module 14 transcribes the voice input of the spoken name into a text transcription of the user/caller's name, such as by using any suitable speech recognition tool, including but not limited to an automatic speech recognition (ASR), computer speech recognition or speech-to-text (STT) tool. As will be appreciated, the digital audio file message submitted by the patient portal 1 may also include additional voice input messages, such as the date of birth of the user/caller which is provided in response to a message prompt sent to the patient portal 1. In this case, the voice-to-text generator module 14 may also transcribe the voice input of the "date of birth" utterance into a text transcription of the date of birth.

With existing voice-to-text tools being designed to convert spoken language into its written form based on a predefined language model, such tools excel at recognizing and transcribing general vocabulary in common usage within a language. For example, a spoken "date of birth" utterance can be accurately transcribed into text format. However, these tools suffer from degraded performance when dealing with proper nouns, such as the unique names of people, places, and potentially brand names, among other examples. In particular, names can vary greatly in pronunciation and spelling, and they may include phonetic elements that are rare or unique, and therefore poorly suited for accurate transcription by voice-to-text tools. Furthermore, the pronunciation of a name can be influenced by the speaker's cultural background or native language, adding another layer of complexity to the task of accurate recognition. When ASR systems encounter such names, their lack of phonetic detail and reliance on language models can result in errors, where the transcribed text does not accurately reflect the spoken input.

To address the challenge of transcription inaccuracies, the identity authentication engine 13 includes a phonetic generator module 15 to provide a post-ASR correction mechanism to the name recognition function. To this end, the phonetic generator module 15 is connected and configured to convert the text transcription of the user/caller's name into a phonetic representation of the user/caller's name, such as by using any suitable phonetic algorithm to represent the user/caller's name with a phonetic representation. In similar fashion, the phonetic generator module 15 can be used to convert the text transcription of each candidate patient name in the patient record database 21 (or a subset of patient names selected on the basis of matching secondary personal information of the user/caller) into a phonetic representation of the candidate patient's name. To this end, the phonetic generator module 15 may implement a phonetic algorithm, including but not limited to Soundex, Daitch-Mokotoff Soundex, Cologne phonetics, Metaphone, Double Metaphone, New York State Identification and Intelligence System (NYSIIS), Match Rating Approach, Caverphone, and the like. In addition and as described more fully below, the phonetic generator module 15 may implement any suitable grapheme to phoneme conversion tool for accurately converting written text (graphemes) into phonetic representations (phonemes). For example, the name "John Carpenter" can be transcribed into phonemes as ["JH", "AA", "N", " ", "K", "AA", "R", "P", "AH", "N", "T", "ER"] which enables accurate phonetic analysis of selected phonetic attributes, such as sonority, manner of articulation, place of articulation, and height. In selected embodiments, the phonetic generator module 15 may be configured to convert a name of the user/calling party and each candidate patient name selected from the patient record database into corresponding phoneme sequences by assigning Sonority, Manner, Place, and Height (SMPH) attribute values to each phoneme in each phoneme sequence.

In addition, the identity authentication engine 13 includes a name matching module 16 which is connected and configured to compare the phonetic representation of the user/caller's name with phonetic representations of patient names stored in the patient record database 21. To save processing costs and time that would be required to evaluate phonetic representations of patient names from a large, open-ended set of records, the name matching module 16 may be configured to evaluate only patient records having a date of birth which matches the date of birth of the user/caller. As disclosed herein, the actual comparison processing at the name matching module 16 may use a phonetic comparator module 17 which employs an enhanced phonetic distance measurement technique wherein a combination of sonority, manner, place, and height (SMPH) attributes approximate the physical characteristics of articulators for each phoneme so that SMPH values can be assigned to each phoneme. In operation, the phonetic comparator module 17 compares the phonetic representations by using specified SMPH attributes along with sequence matching algorithms to provide a scoring measure of the phonetic similarity and distance between the phonetic representation of the user/caller's name and the phonetic representations of patient names. In selected embodiments, the phonetic comparator module 17 may be configured to compute phonetic distances between the phoneme sequence for the user/calling party and the phoneme sequences for each candidate patient name selected from the patient record database based on their SMPH attribute values. In addition, the phonetic comparator module 17 may be configured to normalize the computed phonetic distances to a scale of 0 to 1. In addition, the phonetic comparator module 17 may be configured to apply a sequence alignment algorithm, such as the Needleman-Wunsch algorithm, to align the phoneme sequence of the calling party name with the phoneme sequences of the candidate names utilizing the normalized phonetic distances and incorporating gap penalties. In addition, the phonetic comparator module 17 may be configured to calculate similarity scores between the aligned phoneme sequences based on the sequence alignment and normalized phonetic distances.

In order to improve the accuracy of the identity authentication process, the phonetic comparator module 17 may be configured to evaluate the computed similarity scores against a configurable minimum confidence threshold (MCT) value 18 to identify one or more potential or candidate patient name matches for any similarity score which exceeds the MCT value. In addition or in the alternative, the phonetic comparator module 17 may be configured to evaluate the computed similarity scores against a configurable minimum distance threshold (MDT) value 19 to identify a unique potential match having a similarity score which exceeds the next highest similarity score by the specified MDT value. In addition or in the alternative, the phonetic comparator module 17 may be configured to evaluate the computed similarity scores against a configurable maximum number of candidates (MNC) value 20 to identify a maximum number of candidate patient name matches that can be within the minimum distance of the highest match. If the number of candidate patient name matches having similarity scores within the minimum distance of the highest score is smaller than the MNC value, then the candidate patient name matches will be evaluated with an alternative authentication factor (e.g., on the basis of the social security number records for the user). However, if the number of candidate patient name matches having similarity scores within the minimum distance of the highest score equals or exceeds the MNC value, then the candidate patient name matches are considered an authentication failure, and the call is transferred to a call center scheduler.

As disclosed herein, the phonetic comparator module 17 is configured to compare the calculated similarity scores against one or more predetermined threshold values (e.g., MCT 18, MDT 19, and/or MNC 20) to identify candidate names that are phonetically similar to the name of the patient or calling party. In such embodiments, the threshold values MCT 18, MDT 19, and/or MNC 20 may be determined in such a way that the authentication process as a whole can have a precision of 99.99999 percent. While this may result in transferring some calls to an operator that could have been automatically authenticated, this result will provide enhanced safety and security. It will also be appreciated that the MDT 19 and/or MNC 20 threshold values may be configured or adjusted based on the number of candidate patient names which meet the minimum confidence threshold (MCT) value 18 requirement. For example, if there are only 10 candidate patient name matches meeting the minimum threshold confidence (MCT) value, then the MDT 19 threshold value can be set to a smaller value (e.g., MDT=0.2) to achieve 100% precision. However, if there are 250 candidate patient names meeting the minimum threshold confidence (MCT) value, then the MDT 19 threshold value can be set to a higher value (e.g., MDT=0.4) to achieve 100% precision.

As will be appreciated, once the computer server system 10 is configured to implement the identity authentication engine 13, the computer server system 10 becomes a specialized computing device specifically configured to implement the mechanisms of the illustrative embodiments, and is not a general purpose computing device. Moreover, as described hereafter, the implementation of the mechanisms of the illustrative embodiments improves the functionality of the computer server system 10 and information processing system 100 and provides a useful and concrete result that facilitates the authentication of callers generating and comparing phonetic representations of patient names, thereby improving the accuracy and efficiency of the overall system.

Figure 2:
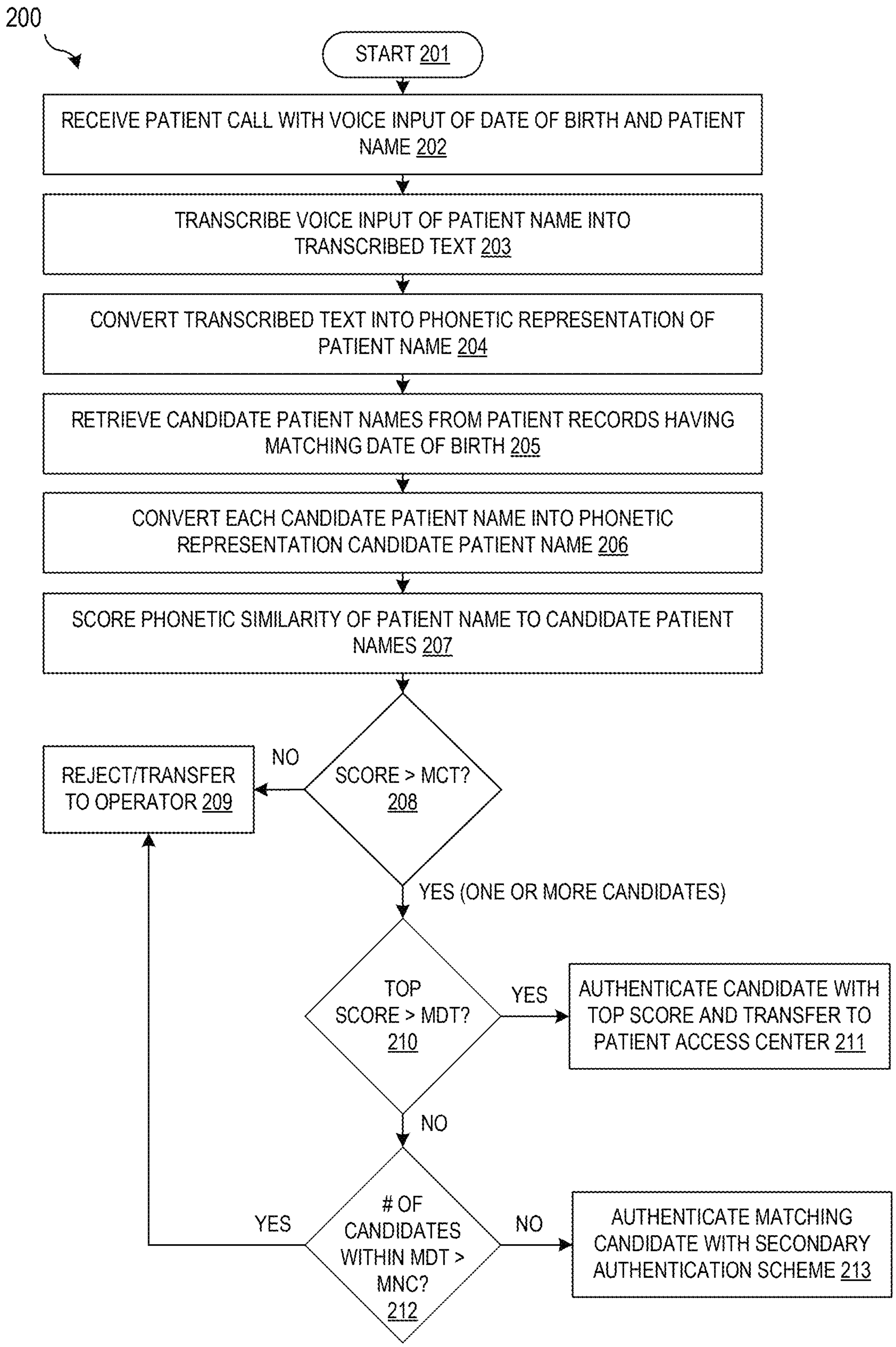
FIG. 2 illustrates an example flow diagram showing the logic for a method of using enhanced phonetic distance metrics to identify and authenticate a user/caller seeking access to a data processing system.

To provide additional details for an improved understanding of selected embodiments of the present disclosure, reference is now made to FIG. 2 which shows a simplified flow chart 200 showing the logic for using enhanced phonetic distance metrics to identify and authenticate a user/caller seeking access to a processing system where someone needs to be authenticated by voice, including but not limited to a call center, physician practice, laboratories, hospital switchboards, and the like. In an example embodiment, the processing shown in FIG. 2 may be performed with an identity authentication engine embodied with dedicated hardware, software, or hybrid implementations and configured for authenticating the identity of a user seeking to access a computer system by converting the user's spoken name into a phonetic representation of the user name that is compared to phonetic representations of candidate user names from records at the computer system to determine if there is a matching record for the user.

After the method starts at step 201, the call center processing system receives a patient call which includes a voice input of the date of birth and patient name for the calling party. In selected embodiments, the patient call may be received as a digital audio file message which includes a digital version of the spoken name of the calling party. The date of birth information for the calling party may also be included in the digital audio file, or may be submitted separately as a digital message that is transmitted by the calling party to the call center processing system.

At step 203, the voice input of the patient name is transcribed into a written text transcription (or grapheme) of the patient name. In selected embodiments, any suitable transcription tool can be used, including but not limited to an automatic speech recognition (ASR) tool (such as CMU Sphinx), a computer speech recognition tool, or a speech-to-text (STT) tool. As will be appreciated, the processing of the written text transcription (or grapheme) of the patient name at step 203 may also include a name extraction process which identifies the actual patient name component from the written text transcription. For example, if the voice input from the patient is an utterance which includes the patient name and an accompanying spelling (e.g., "My name is Gokberk. G-o-k-b-e-r-k. And my last name is Yar. Y-a-r."), an extraction engine component may process the output from the Audio-to-Text process (step 203) to extract only the patient name and leave out the spelling (e.g., "Gokberk Yar" is extracted as the final utterance to be passed to the phoneme converter.) In selected embodiments, the extraction processing could use Context-Free Grammar approaches and custom algorithms to handle variations in pronunciation.

At step 204, the text transcription of the patient name is converted into a phonetic representation of the patient name. As disclosed herein, any suitable phonetic conversion tool can be used to convert the written text (graphemes) transcription of the patient name into a phonetic representation (phoneme), including but not limited to Soundex, Daitch-Mokotoff Soundex, Cologne phonetics, Metaphone, Double Metaphone, New York State Identification and Intelligence System (NYSIIS), Match Rating Approach, Caverphone, and the like. In selected embodiments, the text transcription of the patient name is converted into a phonetic representation (phoneme) of the patient name by specifying or quantifying one or more phonetic attributes that are suitable for performing phonetic analysis. For example, a "Sonority" attribute (S) provides a measure of how loud or resonant a sound is in its vocal tract configuration. Sonority influences the perceptual prominence or strength of phonemes. In addition or in the alternative, a "Manner of Articulation" parameter (M) describes how airflow is restricted or modified to produce different sounds. It includes categories like stops, fricatives, and nasals. In addition or in the alternative, a "Place of Articulation" parameter (P) specifies where in the vocal tract the airflow constriction occurs, such as bilabial (both lips), dental (teeth), or velar (soft palate). In addition or in the alternative, a "Height" parameter (H) is used primarily with vowels to refer to the vertical position of the tongue during vowel production, affecting vowel quality. Taken together, the SMPH attributes provide a phonetic representation of the patient name which can be processed in vector form during a similarity comparison analysis.

At step 205, one or more candidate patient names having a matching secondary personal information (e.g., date of birth or other contextual information for patient caller) are retrieved from the patient records database. In selected embodiments, a list of patient names in text format is retrieved from memory or other database storage by the call center processing system by using secondary personal information to reduce the search space for candidate patient names. For example, using the date of birth (DOB) as an initial search parameter drastically reduces the problem search space. Without using context information to limit the search space, the search space is O(N), requiring a search through all records in the patient records database. The success rate of a Phoneme-based search would be significantly lower without this space reduction. For example, identifying the best match from 100,000 patient names compared to 200 patient names (after space reduction) makes it much easier to differentiate between two individuals named John Smith. As will be appreciated, the retrieval of candidate patient names may use any suitable approach that reduces the search space, such as using phone numbers or Social Security Numbers (SSN), strengthens the system's efficiency.

At step 206, each of the retrieved candidate patient names is converted into a phonetic representation of the candidate patient name. Similar to the conversion processing at step 204, any suitable phonetic conversion tool can be used at step 206 to convert the written text (graphemes) transcription of the retrieved candidate patient names into a phonetic representation (phoneme).

At step 207, each phonetic representation of a candidate patient name is scored for phonetic similarity against the phonetic representation of the patient name. In selected embodiments, the scoring of phonetic similarity may employ an SMPH distance measurement tool which approximates the physical characteristics of articulators for each phoneme by assigning SMPH values, and then calculating the distance between any two phonemes based on these SMPH attributes, thereby providing a nuanced measurement that accounts for the physical and perceptual properties of speech sounds. In selected embodiments, the distances calculated between phonemes may be normalized so that the scale is between 0 and 1, with 1 representing the maximum possible distance and 0 indicating identical phonemes. Normalization makes it easier to compare distances across different pairs of phonemes by standardizing the scale. In addition, the scoring of phonetic similarity may integrate the calculated phonetic distances into string matching algorithms, such as the Needleman-Wunsch algorithm, for various applications, e.g., enhancing the accuracy of ASR systems. This phonetic distance metric allows for more flexible and accurate matching by considering the phonetic and articulatory properties of speech sounds, rather than relying solely on textual similarity.

At step 208, the similarity score for each phonetic representation of a candidate patient name is compared to a specified minimum confidence threshold (MCT) value. In selected embodiments, the MCT value may be configurably set at MCT=0.61 so that only similarity scores above 0.61 are identified as candidate patient names, though the MCT value may be set to any desired number. If a similarity score does not meet or exceed the MCT value (negative outcome to detection step 208), then the calling party cannot be authenticated, in which case automated authentication processing of the call is rejected and transferred to an operator for handing (step 209). However, if a similarity score for a candidate patient name exceeds the MCT value (affirmative outcome to detection step 208), then there are one or more candidate patient names that can be processed further within the automated identity authentication process.

At step 210, the top similarity score for a candidate patient name is compared to the next highest similarity score to determine if the top similarity score exceeds the next highest similarity score by a minimum distance threshold (MDT) value. If the top similarity score exceeds the next highest similarity score by at least the MDT value (affirmative outcome to detection step 210), then the candidate patient name having the top similarity score can be authenticated and transferred to the patient access center at step 211. However, if the top similarity score does not exceed the next highest similarity score by the MDT value (negative outcome to detection step 210), then there are one or more candidate patient names that can be processed further within the automated identity authentication process. In selected embodiments, the MDT value may be configurably set at MDT=0.2 so that only a candidate patient name having a top similarity score which exceeds the next highest similarity score by 0.2 is identified as authenticated patient name, though the MDT value may be set to any desired number.

At step 212, the number of candidate patient names within the minimum distance threshold (MDT) value of the top similarity score is compared to a maximum number of candidates (MNC) value. If the number of candidate patient names within the MDT value of the top similarity score exceeds the MNC value (affirmative outcome to detection step 212), then there are too many candidate patient names to accurately authenticate with the automated identify authentication process, in which case automated authentication processing of the call is rejected and transferred to an operator for handing (step 209). However, if the number of candidate patient names within the MDT value of the top similarity score does not exceed the MNC (negative outcome to detection step 212), then the candidate patient names can be processed further for authentication at step 213 with a secondary authentication scheme, such as by comparing the social security number (SSN) associated with/provided by the calling party against SSN values associated with the candidate patient names. Other secondary authentication schemes include, but are not limited to using the caller phone number, address, biometric data, pass key, voice print, or other identifying characteristic for the calling party. In selected embodiments, the MNC value may be configurably set at MNC=5 so that the processing step 213 is only applied on up to 5 candidate patient names having similarity scores within MDT of the top similarity score, though the MNC value may be set to any desired number.

As will be appreciated, there are numerous advantages and performance improvements provided by the disclosed system, apparatus, computer program code, and methodology for authenticating the identity of a user of a data processing system. For example, the disclosed phonetic authentication approach advantageously complies with the privacy and security protection requirements of the Health Insurance Portability and Accountability Act (HIPAA) by ensuring that patient records are not revealed, and access is not granted, until the authentication process is fully completed. For instance, a conventional authentication process may authenticate a calling patient by comparing their Caller ID with a database and then seek caller confirmation by asking "Are you John Smith?" Since the caller ID phone record identifies John Smith, a malicious actor could obtain this information before authentication is finalized. In contrast, the disclosed phonetic authentication approach does not disclose any Protected Health Information (PHI) until the authentication is fully completed.

Figure 3:
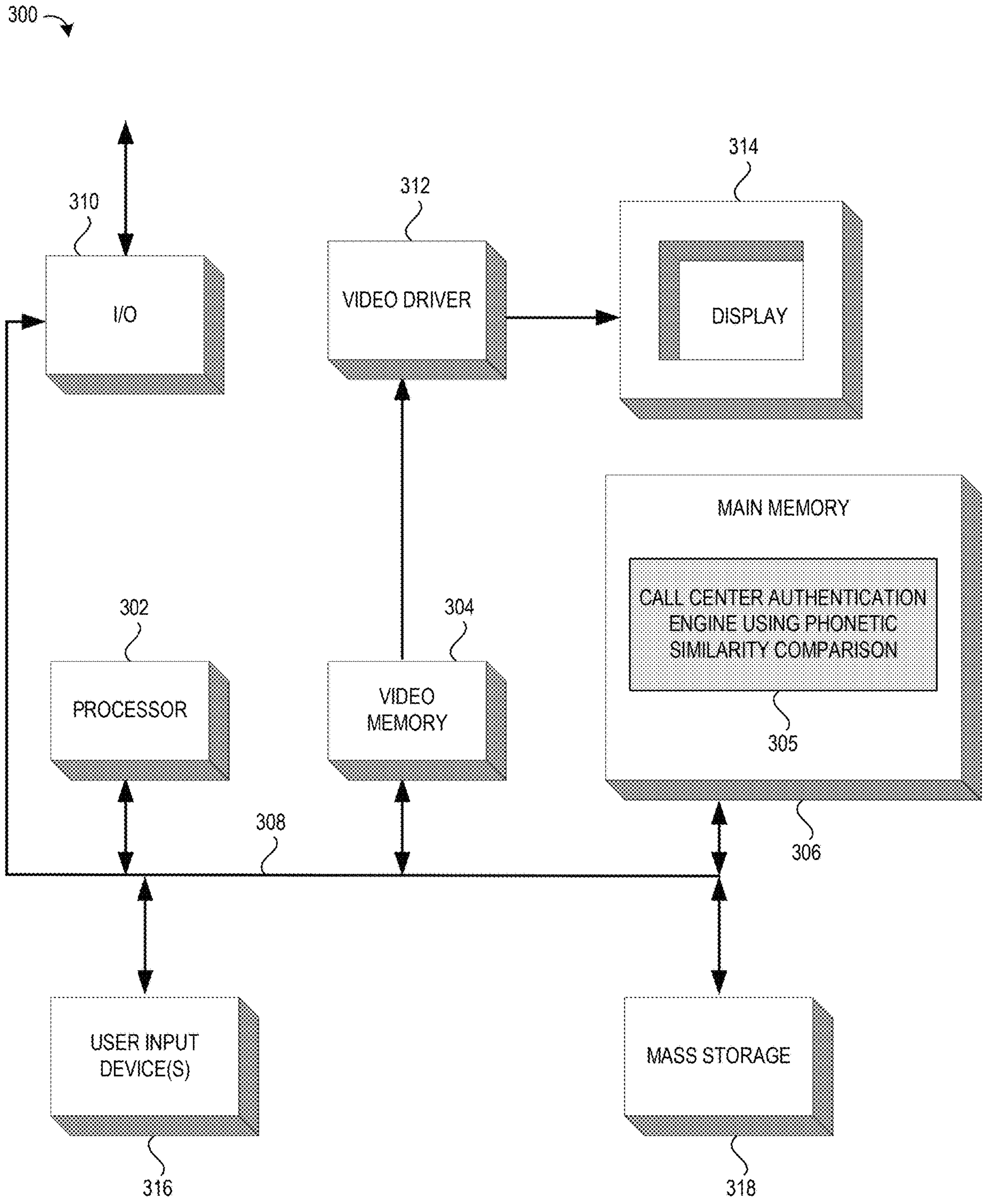
FIG. 3 is a simplified block diagram of a processor and components of an information processing system which includes a call center authentication engine using phonetic similarity comparisons to identify and authenticate a user/caller seeking access to the information processing system in accordance with selected embodiments of the present disclosure.

Embodiments of the system and method for authenticating the identity of a caller to a call center by comparing a phonetic representation of caller name with phonetic representations of stored patient names can be implemented on a computer system, such as the information processing system 300 illustrated in FIG. 3. As disclosed, the information processing system 300 includes input user device(s) 316, such as a keyboard and/or mouse, which are coupled to a bi-directional system bus 308. The input user device(s) 316 are used for introducing user input to the information processing system 300 and communicating that user input to one or more processors 302. The information processing system 300 may also include a video memory 304, main memory 306, and mass storage 318, all coupled to bi-directional system bus 308 along with input user device(s) 316 and processor(s) 302. The mass storage 318 may include both fixed and removable media, such as other available mass storage technology. Bus 308 may contain, for example, 32 address lines for addressing video memory 304 or main memory 306. The system bus 308 may also include, for example, an n-bit data bus for transferring data between and among the components, such as CPU 302, main memory 306, video memory 304, and mass storage 318, where "n" is, for example, 32 or 64. Alternatively, multiplex data/address lines may be used instead of separate data and address lines.

The information processing system 300 may also include I/O device(s) 310 which provide connections to peripheral devices, such as a printer, and may also provide a direct connection to remote server computer systems via a telephone link or to the Internet via an ISP. I/O device(s) 310 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 318 until loaded into main memory 306 for execution. Computer programs may also be in the form of electronic signals modulated in accordance with the computer program and data communication technology when transferred via a network. The method and functions relating to system and method for authenticating a caller identity by comparing phonetic representations of the caller name and stored patient names may be implemented in a computer program for a call center authentication engine 305 which uses phonetic similarity comparison processing to generate and evaluate similarity scores against one or more comparison threshold metric values.

The processor 302, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 306 is comprised of dynamic random access memory (DRAM). Video memory 304 is a dual-ported video random access memory. One port of the video memory 304 is coupled to video amplifier or driver 312. The video amplifier 312 is used to drive the display 314. Video amplifier 312 is well known in the art and may be implemented by any suitable means. This circuitry converts pixel data stored in video memory 304 to a raster signal suitable for use by display 314. Display 314 is a type of monitor suitable for displaying graphic images.

In selected embodiments, the call center authentication engine 305 may be implemented in whole or in part with programming code which provides the functions of generating and comparing phoneme representations of a calling party's name against phoneme representations of a closed set of names in an authentication database to calculate a vector distance that is evaluated as a similarity score using one or more configurable thresholds to authenticate the identity of the calling party. In selected embodiments, different program code classes may be configured and called for converting text transcriptions of names into phonetic representations in an n-dimensional vector space, aligning phonetic representations for a comparative evaluation of similarity, calculating distances or similarity scores between aligned phonetic representations in the n-dimensional vector space, and evaluating the calculated distances or similarity scores against predetermined thresholds to determine if there is a matching record for the calling party.

For example, the call center authentication engine 305 may include a first program code class (e.g., PhonemeConvert) for converting written text (graphemes) into phonetic representations (phonemes) and comparing phonetic representations to one another based on a similarity or distance metric. In operation, the first program code class (PhonemeConvert) may be called to receive an ASR text output generated from the calling party's spoken name, and to generate phoneme representation of the calling party's name with an n-dimensional vector (e.g., an SMPH vector). In similar fashion, the first program code class (PhonemeConvert) may be called to receive a text version of one or more names stored in an authentication database at the call center, and to generate a phoneme representation for each name with an n-dimensional vector (e.g., an SMPH vector). To this end, the core features of the first program code class (PhonemeConvert) may include a Phoneme Conversion function which uses Grapheme-to-phoneme conversion (G2P) model or library module which transduces graphemes (i.e., orthographic symbols) into phonemes (i.e., units of the sound system of a language). In selected embodiments, the core features of the first program code class (PhonemeConvert) may also include a Name Variation Handling function which generates variations of names to account for nicknames, abbreviations, and initials, enhancing the matching flexibility. In selected embodiments, the core features of the first program code class (PhonemeConvert) may also include a Prefix Handling function which allows for the specification of prefixes (e.g., titles) to names, broadening the applicability in formal contexts. The core features of the first program code class (PhonemeConvert) may also include a Phonetic Distance Calculation function which calculates phonetic distances in the n-dimensional vector space between the phoneme representation for the calling party's name and phoneme representations of one or more candidate names retrieved from the authentication database on the basis of contextual information for the calling party (e.g., the date of birth information provided by the calling party).

In addition, the call center authentication engine 305 may include a second program code class (e.g., PhonemeMatcher) which leverages precomputed phoneme vectors, distance calculations, and sequence alignment algorithms to perform sequence matching to authenticate a calling party against one or more names stored in an authentication database at the call center. In operation, the second program code class (PhonemeMatcher) may be called to compare sequences of phonemes (basic units of sound in a language) to determine their phonetic similarity based on vectorized physical attributes (e.g., captured sonority, manner, place, and height). For example, the sequences of vectors may be precomputed phoneme vectors generated by the first program code class (PhonemeConvert) as four-dimensional vectors corresponding to their physical phonetic attributes (SMPH) to allow for a nuanced comparison between phonemes based on their phonetic properties. The core features of the second program code class (PhonemeMatcher) may also include a Sequence Alignment function which aligns phoneme sequences for comparison using algorithms that account for variations in sequence length and alignment. For example, the Sequence Alignment function may apply the Needleman-Wunsch algorithm for sequence alignment which includes a gap penalty to handle mismatches and gaps in the alignment process. In other embodiments, a Dynamic Time Warping (DTW) algorithm may be applied if modified to return a similarity measure in the space [0,1]. The core features of the second program code class (PhonemeMatcher) may include a Phonetic Distance Calculation function which implements one or more method(s) to compute the phonetic distance between phoneme sequences. For example, the Phonetic Distance Calculation function may compute pairwise distances between all phonemes using Euclidean distance, normalizing these distances to fall within a range of 0 to 1. This normalization facilitates meaningful comparisons across diverse phoneme pairs.

By now, it will be appreciated that there is disclosed herein a system, method, apparatus, computer program product, and device for authenticating an identity of a calling party. In the disclosed method, the device receives a call center access request by a calling party who provides audio input of a calling party name and calling party context information. In selected embodiments, the audio input of the calling party name is received in a digital format. In addition, the device converts the audio input of the calling party name into a text format calling party name. In selected embodiments, the device uses an automatic speech recognition (ASR) tool to convert the audio input of the calling party name into the text format. In addition, the device converts the text format calling party name into a phonetic format calling party name in a defined n-dimensional vector space. In selected embodiments, the device uses a grapheme-to-phoneme conversion tool to convert the text format calling party name into the phonetic format calling party name. In such embodiments, the grapheme-to-phoneme conversion tool may generate the phonetic format calling party name by extracting sonority, manner, place, and height (SMPH) attributes from the text format calling party name. In other selected embodiments, the device converts the text format calling party name into the phonetic format calling party name by converting the text format calling party name into a phoneme sequence for the patient name, and then assigning Sonority, Manner, Place, and Height (SMPH) attribute values to each phoneme in the phoneme sequence for the patient name. In addition, the device identifies one or more text format candidate names from a database listing of authorized users on the basis of the calling party context information. In selected embodiments, the device identifies one or more text format candidate names from the database listing of authorized users which have date of birth information matching the date of birth information for the calling party. In other selected embodiments, the device identifies the one or more text format candidate names using secondary personal information for the calling party which is selected from a group consisting of a date of birth value, a phone number, or a Social Security Numbers (SSN) for the calling party. In addition, the device converts the one or more text format candidate names into one or more phonetic format candidate names in the defined n-dimensional vector space. In selected embodiments, the one or more phonetic format candidate names in the defined n-dimensional vector space are defined with reference to sonority, manner, place, and height attributes. In other selected embodiments, the device converts the one or more text format candidate names into one or more phonetic format candidate names by converting a first text format calling party name into a phoneme sequence for the candidate name; and assigning Sonority, Manner, Place, and Height (SMPH) attribute values to each phoneme in the phoneme sequence for the candidate name. In addition, the device computes one or more similarity metric values in the n-dimensional vector space between the phonetic format calling party name and each of the one or more phonetic format candidate names. In selected embodiments, the device computes one or more similarity metric values by computing a phonetic distance between the phoneme sequence for the patient name and the phoneme sequence for the candidate name based on their SMPH attribute values; normalizing the computed phonetic distance to a scale of 0 to 1 to compute a normalized phonetic distance; applying a sequence alignment algorithm to align the phoneme sequence for the patient name with the phoneme sequence for the candidate name using the normalized phonetic distance; and calculating a first similarity metric value between the aligned phoneme sequence for the patient name and phoneme sequence for the candidate. In addition, the device evaluates the one or more computed similarity metric values against one or more predetermined threshold comparison metric values to authenticate the calling party if a computed similarity metric value satisfies the one or more predetermined threshold comparison metric values. In selected embodiments, the device evaluates the one or more computed similarity metric values against one or more predetermined threshold comparison metric values by identifying a phonetic format candidate name which has a computed similarity metric value that exceeds a minimum confidence threshold comparison metric value. In other selected embodiments, the device evaluates the one or more computed similarity metric values against one or more predetermined threshold comparison metric values by identifying a phonetic format candidate name which has a computed similarity metric value that exceeds a minimum confidence threshold comparison metric value and that also exceeds next highest computed similarity metric value by a minimum distance threshold comparison metric value. In other selected embodiments, the device evaluates the one or more computed similarity metric values by identifying a plurality of phonetic format candidate names which have computed similarity metric values that exceed a minimum confidence threshold comparison metric value; and applying a secondary authentication scheme to the calling party if a total count of the plurality of phonetic format candidate names is lower than a maximum number of candidate threshold comparison metric value. In other selected embodiments, the device evaluates the one or more computed similarity metric values by inputting a plurality of computed similarity metric values and additional derived features into a trained neural network; obtaining output probabilities from the trained neural network for each candidate name selected from the database listing of authorized users on the basis of the calling party context information;

and authenticating the calling party based on the output probabilities, wherein the trained neural network is trained on historical authentication data to optimize accuracy and adaptability of the authentication process.

In another form, there is provided a system, method, apparatus, device, and computer program product computer program product having at least one recordable medium having stored thereon executable instructions and data which, when executed by at least one processing device, cause the at least one processing device to authenticate an identity of a calling party. As disclosed, the computer program product instructions and data are executed to receive an access request by a calling party who provides audio input of a calling party name and secondary identification information for the calling party. In addition, the computer program product instructions and data are executed to convert the audio input of the calling party name into a first phoneme sequence characterized by Sonority, Manner, Place, and Height (SMPH) attribute values for each phoneme in the first phoneme sequence. In addition, the computer program product instructions and data are executed to identify one or more candidate names from a database listing of authorized users on the basis of the secondary identification information for the calling party. In addition, the computer program product instructions and data are executed to convert each of the one or more candidate names from a text format into a corresponding candidate phoneme sequence characterized by Sonority, Manner, Place, and Height (SMPH) attribute values for each phoneme in the corresponding candidate phoneme sequence. In addition, the computer program product instructions and data are executed to compute a similarity metric value between each corresponding candidate phoneme sequence and the first phoneme sequence, thereby generating one or more similarity metric values. In selected embodiments, the computer program product instructions and data are executed to compute the similarity metric value by computing a phonetic distance between the first phoneme sequence and each corresponding candidate phoneme sequence based on their SMPH attribute values; normalizing the computed phonetic distance to a scale of 0 to 1 to compute a normalized phonetic distance; applying, for each corresponding candidate phoneme sequence, a sequence alignment algorithm to align the first phoneme sequence with each corresponding candidate phoneme sequence using the normalized phonetic distance; and calculating a similarity metric value between the aligned first phoneme sequence and each corresponding candidate phoneme sequence. In addition, the computer program product instructions and data are executed to evaluate the one or more similarity metric values against one or more predetermined threshold comparison values to authenticate the calling party. In selected embodiments, the computer program product instructions and data are executed to evaluate the one or more similarity metric values by identifying a candidate phoneme sequence which has a similarity metric value that exceeds a minimum confidence threshold comparison metric value and that also exceeds next highest computed similarity metric value by a minimum distance threshold comparison metric value. In other selected embodiments, the computer program product instructions and data are executed to evaluate the one or more similarity metric values by identifying a plurality of candidate phoneme sequences which have computed similarity metric values that exceed a minimum confidence threshold comparison metric value; and applying a secondary authentication scheme to the calling party if a total count of the plurality of candidate phoneme sequences is lower than a maximum number of candidate threshold comparison metric value.

In yet another form, there is provided a system having one or more processors, a memory coupled to at least one of the processors, and a set of instructions stored in the memory and executed by at least one of the processors to authenticate an identity of a calling party. The disclosed set of instructions are executed to receive an access request by a calling party who provides audio input of a calling party name and secondary identification information for the calling party. In addition, the disclosed set of instructions are executed to convert the audio input of the calling party name into a first phoneme sequence characterized by Sonority, Manner, Place, and Height (SMPH) attribute values for each phoneme in the first phoneme sequence. In addition, the disclosed set of instructions are executed to identify one or more candidate names from a database listing of authorized users on the basis of the secondary identification information for the calling party. In addition, the disclosed set of instructions are executed to convert each of the one or more candidate names from a text format into a corresponding candidate phoneme sequence characterized by Sonority, Manner, Place, and Height (SMPH) attribute values for each phoneme in the corresponding candidate phoneme sequence. In addition, the disclosed set of instructions are executed to compute a similarity metric value between each corresponding candidate phoneme sequence and the first phoneme sequence, thereby generating one or more similarity metric values. In addition, the disclosed set of instructions are executed to evaluate the one or more similarity metric values against one or more predetermined threshold comparison values to authenticate the calling party.

The present disclosure may be a system, a method, and/or a computer program product such that selected embodiments include software that performs certain tasks. The software discussed herein may include script, batch, or other executable files. The software may be stored on a machine-readable or computer-readable storage medium, and is otherwise available to direct the operation of the computer system as described herein and claimed below. In one embodiment, the software uses a local or database memory to implement the data transformation and data structures so as to automatically constrain, limit, filter, convert, and compare phonetic representations of the patient names in the patient record database that are semantically similar to a patient name provided by a user, thereby improving the quality and robustness of identity authentication results generated by the call center authentication engine. The local or database memory used for storing firmware or hardware modules in accordance with an embodiment of the disclosure may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

In addition, selected aspects of the present disclosure may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present disclosure may take the form of computer program product embodied in a computer readable storage medium or media having computer readable program instructions thereon for causing a processor to carry out aspects of the present disclosure. Thus embodied, the disclosed system, a method, and/or a computer program product is operative to improve the design, functionality and performance of a customer call center by automatically constraining, limiting, filtering, converting, and comparing phonetic representations of the patient names in the patient record database that are semantically similar to a patient name provided by a user.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Visual Basic.net, Ruby, Smalltalk, C++ or the like, and conventional procedural programming languages, such as the "C" programming language, Hypertext Preprocessor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart and message sequence illustrations and/or block diagrams of methods, apparatus (systems), and computer program products according to embodiments of the disclosure. It will be understood that each block of the illustrations and/or block diagrams, and combinations of blocks in the illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system described above is for purposes of example only, and may be implemented in any type of computer system or programming or processing environment, or in a computer program, alone or in conjunction with hardware. Various embodiments of the present disclosure may also be implemented in software stored on a computer-readable medium and executed as a computer program on a general purpose or special purpose computer. For clarity, only those aspects of the system germane to the disclosure are described, and product details well known in the art are omitted. For the same reason, the computer hardware is not described in further detail.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method performed by a device for authenticating an identity of a calling party, comprising:

- receiving, by the device, a call center access request by a calling party who provides audio input of a calling party name and calling party context information;
- converting, by the device, the audio input of the calling party name into a text format calling party name;
- converting, by the device, the text format calling party name into a phonetic format calling party name in a defined n-dimensional vector space;
- identifying, by the device, one or more text format candidate names from a database listing of authorized users on the basis of the calling party context information;
- converting, by the device, the one or more text format candidate names into one or more phonetic format candidate names in the defined n-dimensional vector space;
- computing, by the device, one or more similarity metric values in the n-dimensional vector space between the phonetic format calling party name and each of the one or more phonetic format candidate names;
- evaluating, by the device, the one or more computed similarity metric values against one or more predetermined threshold comparison metric values to authenticate the calling party if a computed similarity metric value satisfies the one or more predetermined threshold comparison metric values.

2. The method of claim 1, where the audio input of the calling party name is received in a digital format.

3. The method of claim 1, where the device uses an automatic speech recognition (ASR) tool to convert the audio input of the calling party name into the text format.

4. The method of claim 1, where the device uses a grapheme-to-phoneme conversion tool to convert the text format calling party name into the phonetic format calling party name.

5. The method of claim 4, where the grapheme-to-phoneme conversion tool generates the phonetic format calling party name by extracting sonority, manner, place, and height (SMPH) attributes from the text format calling party name.

6. The method of claim 1, where the device identifies one or more text format candidate names from the database listing of authorized users which have date of birth information matching the date of birth information for the calling party.

7. The method of claim 1, where evaluating the one or more computed similarity metric values against one or more predetermined threshold comparison metric values comprises identifying a phonetic format candidate name which has a computed similarity metric value that exceeds a minimum confidence threshold comparison metric value.

8. The method of claim 1, where evaluating the one or more computed similarity metric values against one or more predetermined threshold comparison metric values comprises identifying a phonetic format candidate name which has a computed similarity metric value that exceeds a minimum confidence threshold comparison metric value and that also exceeds next highest computed similarity metric value by a minimum distance threshold comparison metric value.

9. The method of claim 1, where evaluating the one or more computed similarity metric values against one or more predetermined threshold comparison metric values comprises:

- identifying, by the device, a plurality of phonetic format candidate names which have computed similarity metric values that exceed a minimum confidence threshold comparison metric value; and
- applying, by the device, a secondary authentication scheme to the calling party if a total count of the plurality of phonetic format candidate names is lower than a maximum number of candidate threshold comparison metric value.

10. The method of claim 1, where the one or more text format candidate names are identified using secondary personal information for the calling party which is selected from a group consisting of a date of birth value, a phone number, or a Social Security Numbers (SSN) for the calling party.

11. The method of claim 1, where the one or more phonetic format candidate names in the defined n-dimensional vector space are defined with reference to sonority, manner, place, and height attributes.

12. The method of claim 1, where converting the text format calling party name into the phonetic format calling party name comprises:

- converting the text format calling party name into a phoneme sequence for the patient name; and
- assigning Sonority, Manner, Place, and Height (SMPH) attribute values to each phoneme in the phoneme sequence for the patient name.

13. The method of claim 12, where converting the one or more text format candidate names into one or more phonetic format candidate names comprises:

- converting a first text format calling party name into a phoneme sequence for the candidate name; and
- assigning Sonority, Manner, Place, and Height (SMPH) attribute values to each phoneme in the phoneme sequence for the candidate name.

14. The method of claim 13, where computing one or more similarity metric values comprises:

computing a phonetic distance between the phoneme sequence for the patient name and the phoneme sequence for the candidate name based on their SMPH attribute values;

normalizing the computed phonetic distance to a scale of 0 to 1 to compute a normalized phonetic distance;

applying a sequence alignment algorithm to align the phoneme sequence for the patient name with the phoneme sequence for the candidate name using the normalized phonetic distance; and calculating a first similarity metric value between the aligned phoneme sequence for the patient name and phoneme sequence for the candidate.

15. The method of claim 1, where evaluating the one or more computed similarity metric values comprises:

inputting a plurality of computed similarity metric values and additional derived features into a trained neural network;

obtaining output probabilities from the trained neural network for each candidate name selected from the database listing of authorized users on the basis of the calling party context information; and authenticating the calling party based on the output probabilities, wherein the trained neural network is trained on historical authentication data to optimize accuracy and adaptability of the authentication process.

16. A computer program product comprising at least one recordable medium having stored thereon executable instructions and data which, when executed by at least one processing device, cause the at least one processing device to authenticate an identity of a calling party by:

receiving an access request by a calling party who provides audio input of a calling party name and secondary identification information for the calling party;

converting the audio input of the calling party name into a first phoneme sequence characterized by Sonority, Manner, Place, and Height (SMPH) attribute values for each phoneme in the first phoneme sequence;

identifying one or more candidate names from a database listing of authorized users on the basis of the secondary identification information for the calling party;

converting each of the one or more candidate names from a text format into a corresponding candidate phoneme sequence characterized by Sonority, Manner, Place, and Height (SMPH) attribute values for each phoneme in the corresponding candidate phoneme sequence;

computing a similarity metric value between each corresponding candidate phoneme sequence and the first phoneme sequence, thereby generating one or more similarity metric values; and evaluating the one or more similarity metric values against one or more predetermined threshold comparison values to authenticate the calling party.

17. The computer program product of claim 16, wherein the executable instructions and data, when executed on the at least one processing device, cause the at least one processing device to compute the similarity metric value by:

computing a phonetic distance between the first phoneme sequence and each corresponding candidate phoneme sequence based on their SMPH attribute values;

normalizing the computed phonetic distance to a scale of 0 to 1 to compute a normalized phonetic distance;

applying, for each corresponding candidate phoneme sequence, a sequence alignment algorithm to align the first phoneme sequence with each corresponding candidate phoneme sequence using the normalized phonetic distance; and calculating a similarity metric value between the aligned first phoneme sequence and each corresponding candidate phoneme sequence.

18. The computer program product of claim 16, wherein the executable instructions and data, when executed on the at least one processing device, cause the at least one processing device to evaluate the one or more similarity metric values by:

identifying a candidate phoneme sequence which has a similarity metric value that exceeds a minimum confidence threshold comparison metric value and that also exceeds next highest computed similarity metric value by a minimum distance threshold comparison metric value.

19. The computer program product of claim 16, wherein the executable instructions and data, when executed on the at least one processing device, cause the at least one processing device to evaluate the one or more similarity metric values by:

identifying a plurality of candidate phoneme sequences which have computed similarity metric values that exceed a minimum confidence threshold comparison metric value; and applying a secondary authentication scheme to the calling party if a total count of the plurality of candidate phoneme sequences is lower than a maximum number of candidate threshold comparison metric value.

20. A system comprising:

one or more processors;

a memory coupled to at least one of the processors; and a set of instructions stored in the memory and executed by at least one of the processors to authenticate an identity of a calling party, wherein the set of instructions are executable to perform actions of:

receiving an access request by a calling party who provides audio input of a calling party name and secondary identification information for the calling party;

converting the audio input of the calling party name into a first phoneme sequence characterized by Sonority, Manner, Place, and Height (SMPH) attribute values for each phoneme in the first phoneme sequence;

identifying one or more candidate names from a database listing of authorized users on the basis of the secondary identification information for the calling party;

converting each of the one or more candidate names from a text format into a corresponding candidate phoneme sequence characterized by Sonority, Manner, Place, and Height (SMPH) attribute values for each phoneme in the corresponding candidate phoneme sequence;

computing a similarity metric value between each corresponding candidate phoneme sequence and the first phoneme sequence, thereby generating one or more similarity metric values; and evaluating the one or more similarity metric values against one or more predetermined threshold comparison values to authenticate the calling party.

* * * * *